United States Patent
Hawes

(10) Patent No.: US 8,287,015 B2
(45) Date of Patent: Oct. 16, 2012

(54) PICK AND PLACE GRIPPER DEVICE

(75) Inventor: Richard John Hawes, Hethersett (GB)

(73) Assignee: AEW Delford Systems Limited, Norwich (GB)

( * ) Notice: Subject to any disclaimer, the term of this patent is extended or adjusted under 35 U.S.C. 154(b) by 222 days.

(21) Appl. No.: 12/598,231

(22) PCT Filed: Apr. 30, 2008

(86) PCT No.: PCT/GB2008/001491
§ 371 (c)(1),
(2), (4) Date: Dec. 28, 2009

(87) PCT Pub. No.: WO2008/135720
PCT Pub. Date: Nov. 13, 2008

(65) Prior Publication Data
US 2010/0133862 A1    Jun. 3, 2010

(30) Foreign Application Priority Data

May 3, 2007 (GB) .................................. 0708571.5
Sep. 5, 2007 (GB) .................................. 0717217.4

(51) Int. Cl.
*B25J 15/00* (2006.01)

(52) U.S. Cl. .................. 294/86.4; 294/198; 294/902

(58) Field of Classification Search ................ 294/86.4, 294/198, 119.2, 902; 901/37, 39
See application file for complete search history.

(56) References Cited

U.S. PATENT DOCUMENTS

| | | | | |
|---|---|---|---|---|
| 2,780,951 A * | 2/1957 | Bram | ................... | 81/64 |
| 3,322,455 A * | 5/1967 | Gressbach | ................... | 294/104 |
| 5,209,537 A * | 5/1993 | Smith et al. | ................... | 294/111 |
| 5,398,983 A | 3/1995 | Ahrens | | |
| 5,562,386 A * | 10/1996 | Browning | ................... | 414/408 |
| 5,639,201 A * | 6/1997 | Curotto | ................... | 414/408 |
| 7,226,098 B1 * | 6/2007 | Moreira | ................... | 294/1.4 |
| 7,347,657 B2 * | 3/2008 | Brunn | ................... | 414/408 |

FOREIGN PATENT DOCUMENTS

| | | |
|---|---|---|
| JP | 61241032 | 4/1985 |
| JP | 08-132379 | * 5/1996 |
| JP | 08309685 | 11/1996 |
| JP | 2001219392 | 8/2001 |
| KR | 20040028413 | 9/2002 |

(Continued)

OTHER PUBLICATIONS

International Search Report and Written Opinion for International Application No. PCT/GB2008/001491 (Jul. 22, 2008).

(Continued)

*Primary Examiner* — Dean Kramer
(74) *Attorney, Agent, or Firm* — Marshall, Gerstein & Borun LLP; Richard M. LaBerge

(57) ABSTRACT

A gripper device is provided for picking up and releasing an article. The device includes a support (15, 16) and a pair of grippers (10, 11) pivotally mounted on the support for movement of their distal ends towards and away from each other. A belt (1) is belt arranged to extend across the gap defined between the distal ends of the grippers when they are spaced apart so that the belt is able to extend over the article to be picked up and to extend around the article when the grippers have been moved towards each other to pick up the article.

16 Claims, 10 Drawing Sheets

FOREIGN PATENT DOCUMENTS

| | | |
|---|---|---|
| SU | 611775 | 6/1978 |
| WO | WO 99/00306 | 1/1999 |
| WO | WO 2005/002797 | 1/2005 |
| WO | WO 2007/093774 | 8/2007 |

OTHER PUBLICATIONS

Search Report from the United Kingdom Intellectual Property Office for corresponding application GB0717217.4, dated Dec. 17, 2007.

* cited by examiner

PICK AND PLACE GRIPPER DEVICE

FIELD OF THE INVENTION

The present invention relates to a gripper device for picking up and releasing an article. More particularly, the device may be mounted at the end of a moveable arm so that it can pick up an article from one location and place it in another.

SUMMARY OF THE INVENTION

The present invention provides a gripper device for picking up and releasing an article, comprising:
  a support;
  a pair of grippers pivotally mounted on the support for movement of distal ends thereof towards and away from each other; and
  a belt arranged to extend across the gap defined between the distal ends of the grippers when they are spaced apart so that the belt is able to extend over the article to be picked up and to extend around the article when the grippers have been moved towards each other to pick up the article.

The pivotal action of the gripper in combination with the belt provides an effective arrangement for reliably picking up a range of articles of varying size and shape.

A gripper device embodying the invention may be particularly suitable for picking up a pliable article from a support surface, such as a food product.

In a preferred embodiment, the belt extends directly across the gap between the distal ends of the grippers.

The belt and grippers may be arranged such that when the distal ends of the grippers move towards each other to pick up an article their distal ends are able to penetrate between the said article and the support surface. The presence of the belt may help to lift the article from the support surface clear of the distal ends of the grippers as they are brought together.

An end portion at the distal end of each gripper is preferably angled inwardly towards the other gripper, with respect to the radial direction from each gripper pivot, to help the grippers to scoop up an article. Alternatively, or more particularly, each end portion may define an engagement surface which forms an obtuse angle with respect to said radial direction when viewed parallel to the pivotal axis of the gripper. The obtuse angle may be in the range of 120° to 160°, and is preferably around 140°.

Preferably, the grippers are linked together via a linkage arranged such that the grippers are rotatable in an opposite sense to each other and each rotates through substantially the same angle as the other. Thus the operation of the gripper device is substantially symmetrical with respect to a central plane of the device.

In preferred embodiments, the gripper device includes a belt tensioning arrangement for controlling the tension of the belt. The belt tensioning arrangement may comprise a pair of arms pivotally mounted on the support, with their distal ends coupled to respective ends of the belt. Preferably, the arms are linked together via a linkage arranged such that the arms are rotatable in an opposite sense to each other and each rotates through substantially the same angle as the other.

Each arm may include a pair of bars having longitudinal axes substantially parallel with the pivotal axes of the arms. Each end of the belt passes between a respective pair of bars such that friction between the belt and the bars is able to assist in tensioning of the belt.

In some embodiments, the belt is formed of an elastic material. Each end of the elastic belt may be attached to a respective gripper, in which case a belt tensioning arrangement may not be required.

In a preferred configuration an end portion at the distal end of each gripper is angled inwardly towards the other gripper, with respect to the radial direction from each gripper pivot at the distal ends. This assists penetration of the grippers beneath an article to be picked up.

The invention further provides a method for picking up an article from a support surface with a gripper device as described herein, comprising:
  pivoting the pair of grippers towards each other such that their distal ends penetrate between the article and the support surface, with the belt sandwiched between each gripper and the article and extending between the grippers above the article, until the gripper device is able to lift the article from the support surface.

The belt tensioning arrangement may then be used to increase the tension in the belt, drawing the belt out from between the grippers so that it wraps around the article to is retain it in position. If the article is pliable, this action may also be used to squeeze the article into a more compact shape.

With the article held in the gripper device, it can then be moved to another location (for example by a robot arm) where the article is to be released. It may be released by driving the grippers apart. Alternatively, it may be released by reducing or removing the driving force applied to the grippers, allowing the belt tension to force the grippers apart.

BRIEF DESCRIPTION OF THE DRAWINGS

A sequence of operation of a gripper device embodying the present invention will now be described by way of example and with reference to the accompanying schematic drawings, wherein.

DETAILED DESCRIPTION OF THE DRAWINGS

The gripper is operable to roll up pliable product such as chicken fillets and retain that shape while placing in a tray. This is desirable by supermarkets because it gives a tidy and compact presentation.

The gripper can equally be used for relatively rigid products such as chicken drumsticks. It will not change the shape of such a product, but the positive ejection by the belt tension can be used to aid accurate placement rather than relying on gravity.

The belt is designed and mounted so that it can be replaced easily for hygiene purposes, without use of tools. It extends around the distal ends of the grippers. A large wrap angle around 2 stationary bars is employed to take the belt load largely in friction, so that the single mounting hole at each end is not over-stressed.

Figure 1:
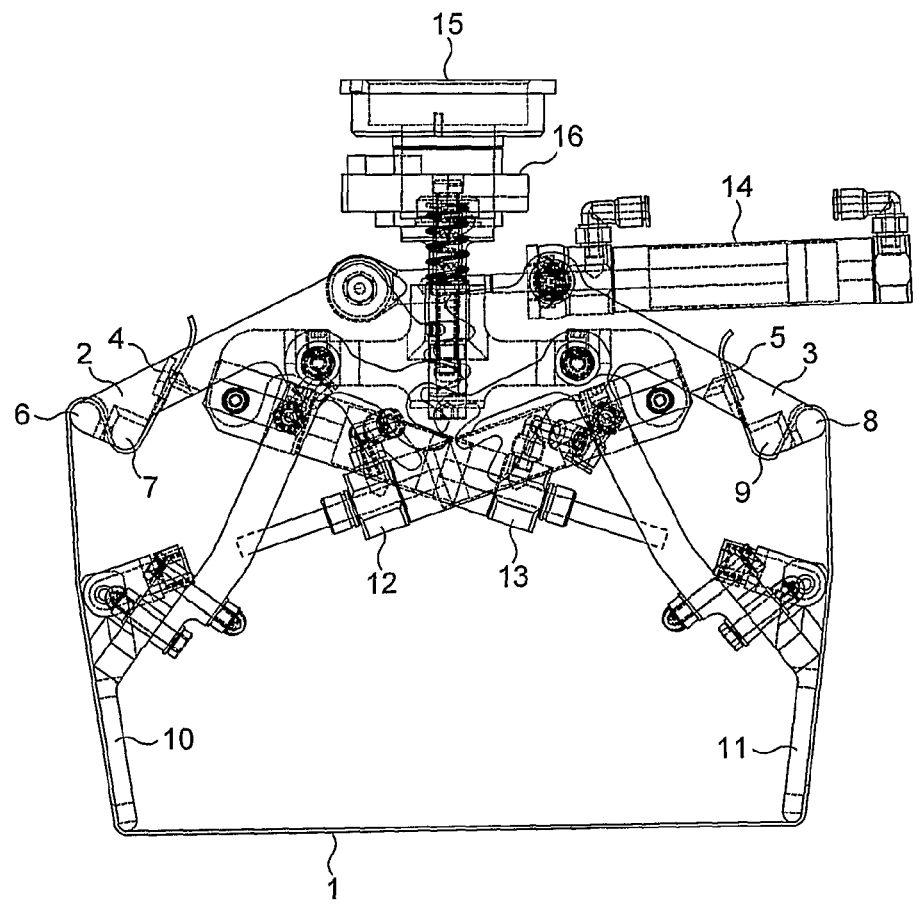
FIG. 1 is a side view of the gripper assembly showing hidden detail and with the belt in place. The gripper is shown approaching the target product on a conveyor belt or similar. The approach direction is generally from above the product.
Figure 2:
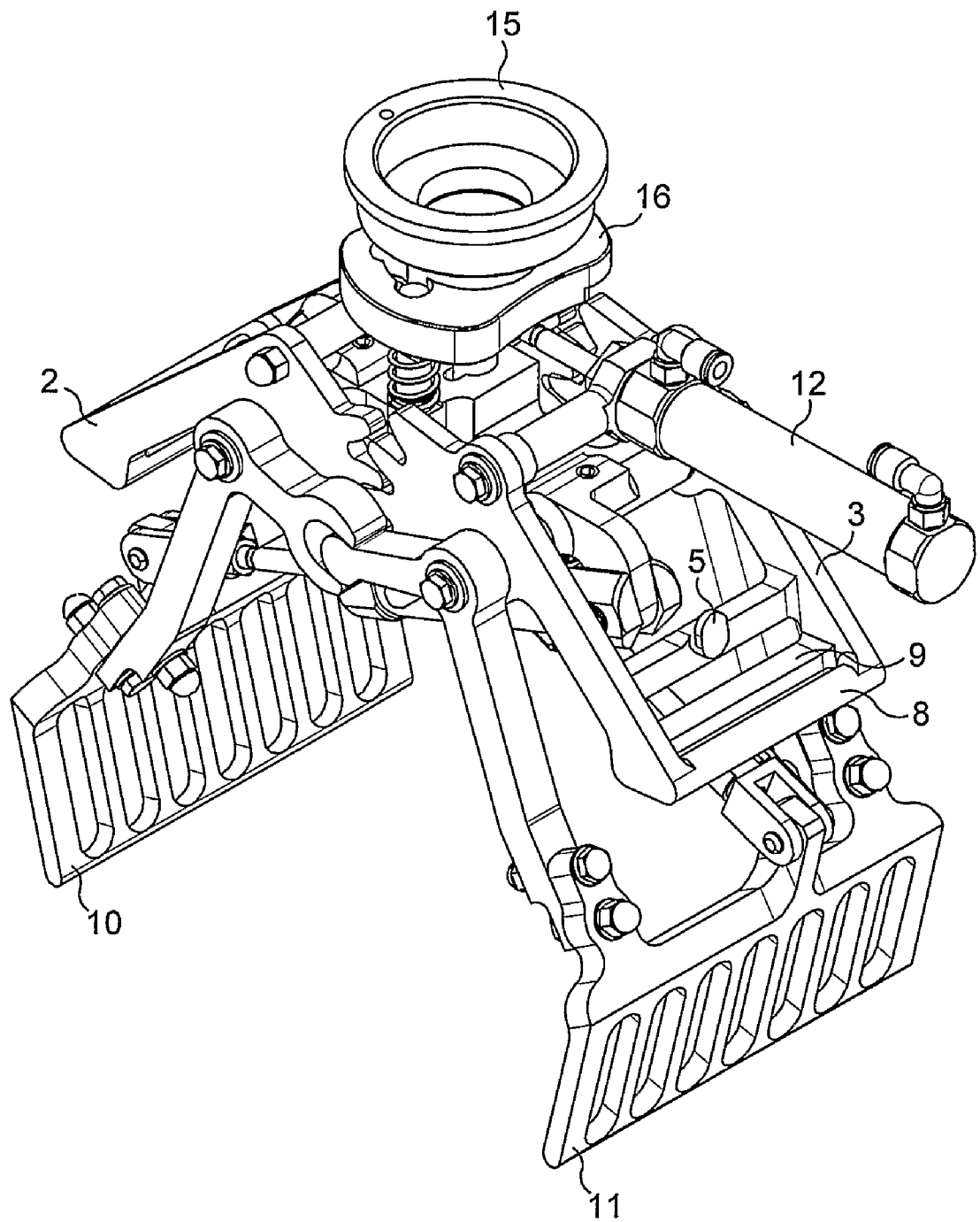
FIG. 2 is an isometric view of FIG. 1 but not showing the belt and product.

In FIG. 1, 1 is the flexible belt, probably not under tension in this position. The belt is hooked to pivoting arms 2 and 3 at 4 and 5 wrapping around bars 6,7,8,9 such that tension in the belt is largely absorbed by frictional resistance around the bars. The bars form part of the arms 2 and 3. The arms 2 and 3 are geared together so that they rotate in an opposite sense to each other and by the same angle thus ensuring the belt is moved symmetrically. The arms 2 and 3 are actuated by a pneumatic cylinder 14, having its base pivoting on arm 3 and the rod end connected to arm 2.

The product is gripped by the jaws 10 and 11 which are actuated by pneumatic cylinders 12 and 13. The jaws are geared together so that they rotate in an opposite sense to each other and by the same angle, ensuring that the pick and place is largely symmetrical about a central plane.

The operation of the cylinders may for example be as described below.

Figure 3:
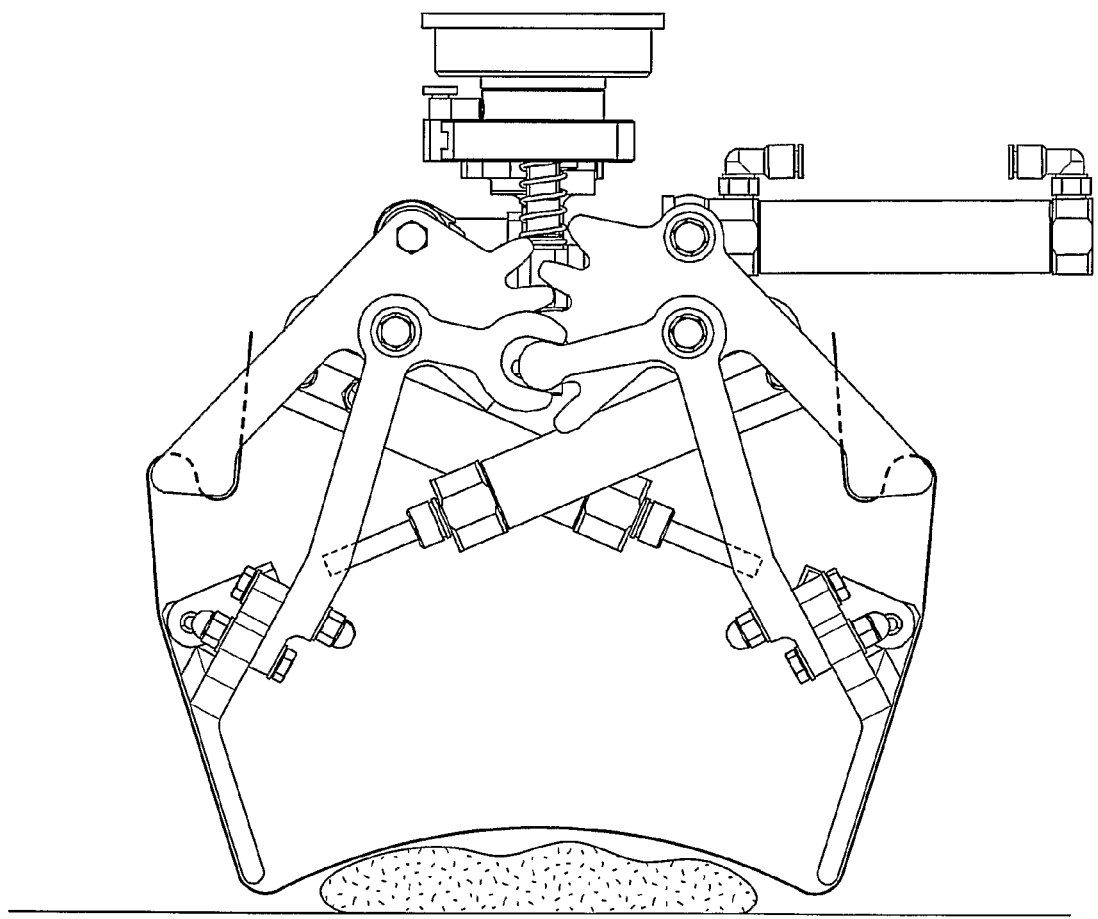
FIG. 3 shows the gripper in position over the product with the belt laying on top of s the product.
Figure 4:
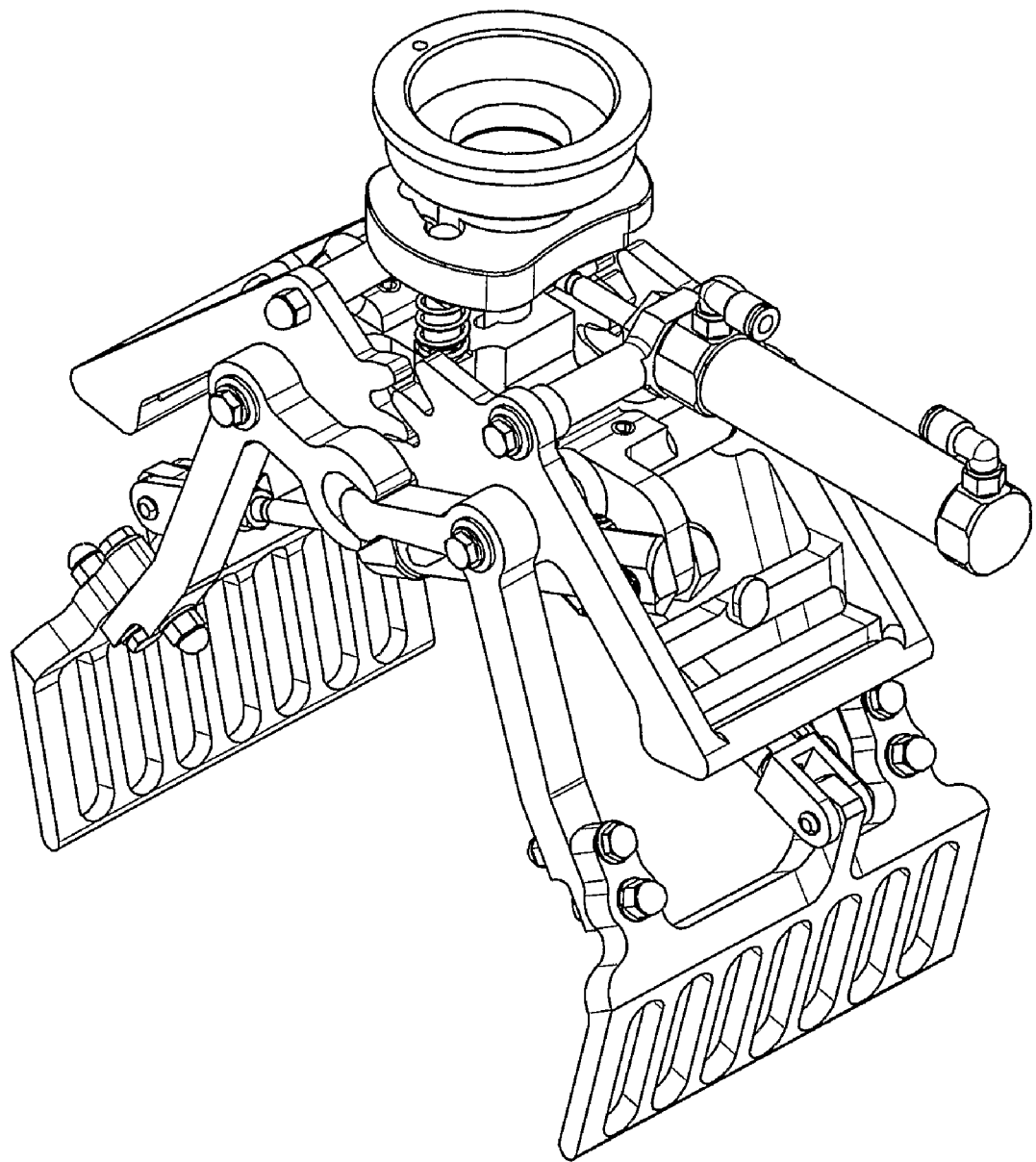
FIG. 4 is an isometric view of FIG. 3 but not showing the belt and product.
Figure 5:
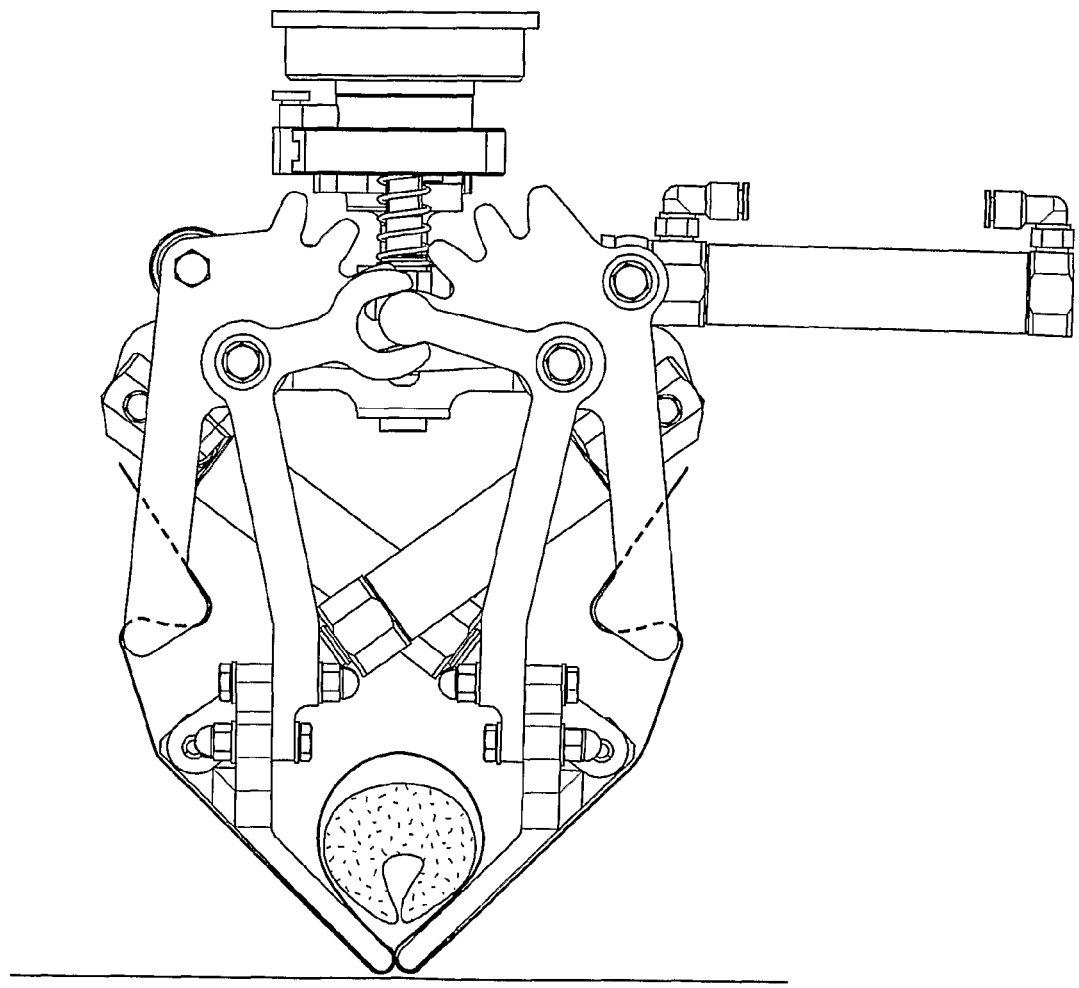
FIG. 5 shows the jaws closed around the product squeezing it up to a new shape (if it is pliable) and picking it up from the conveyor belt surface.
Figure 6:
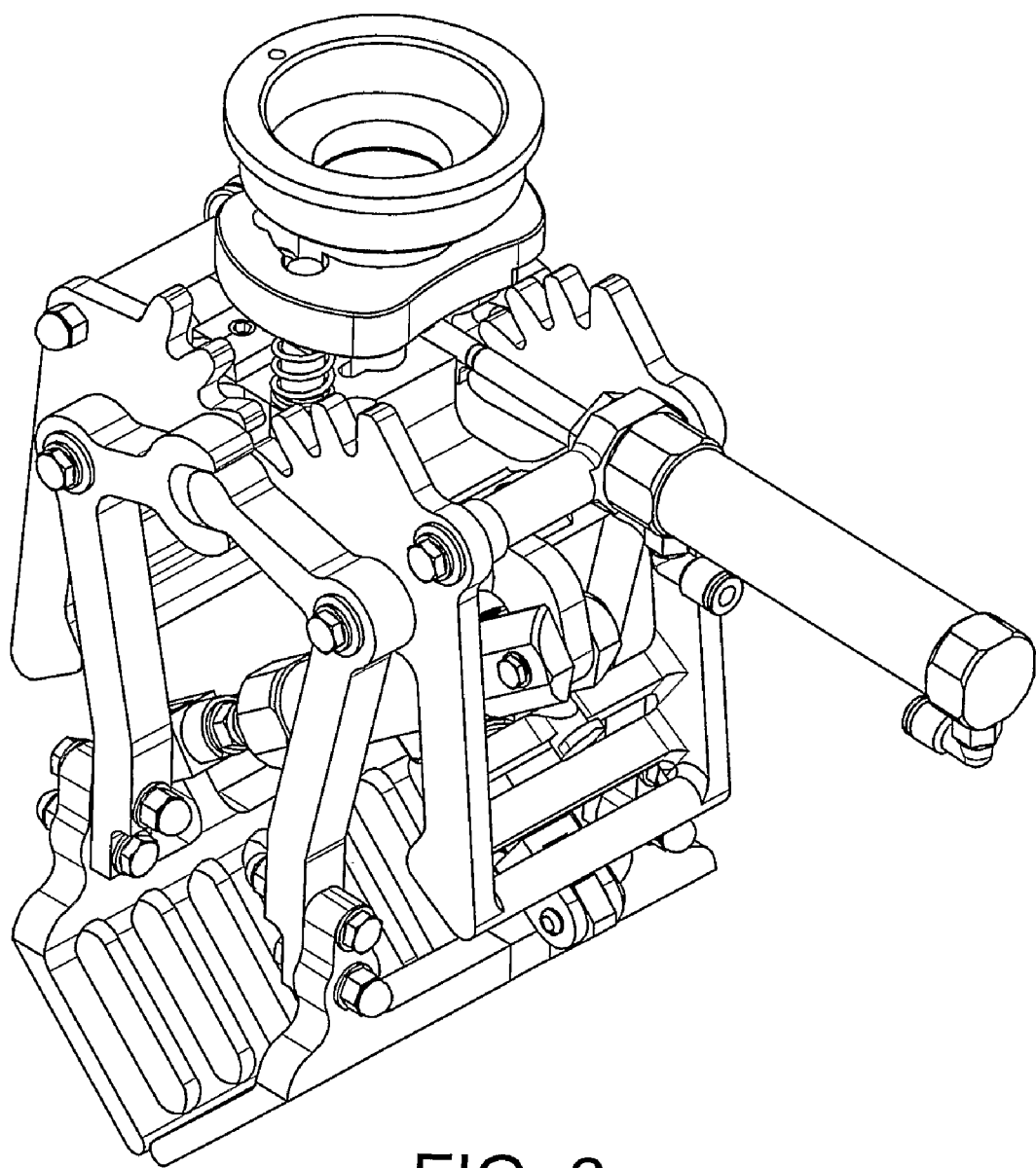
FIG. 6 is an isometric view of FIG. 5 but not showing the belt and product.

In FIG. 1 the jaws are driven open (i.e. 12 and 13 are extended). The cylinder 14 is not under pressure at all and is free to move as required by the belt contacting the product, see FIG. 3. In FIG. 5 the pressure on cylinders 12 and 13 is switched so that the jaws are drawn together. The cylinder 14 is still not pressurised.

Figure 7:
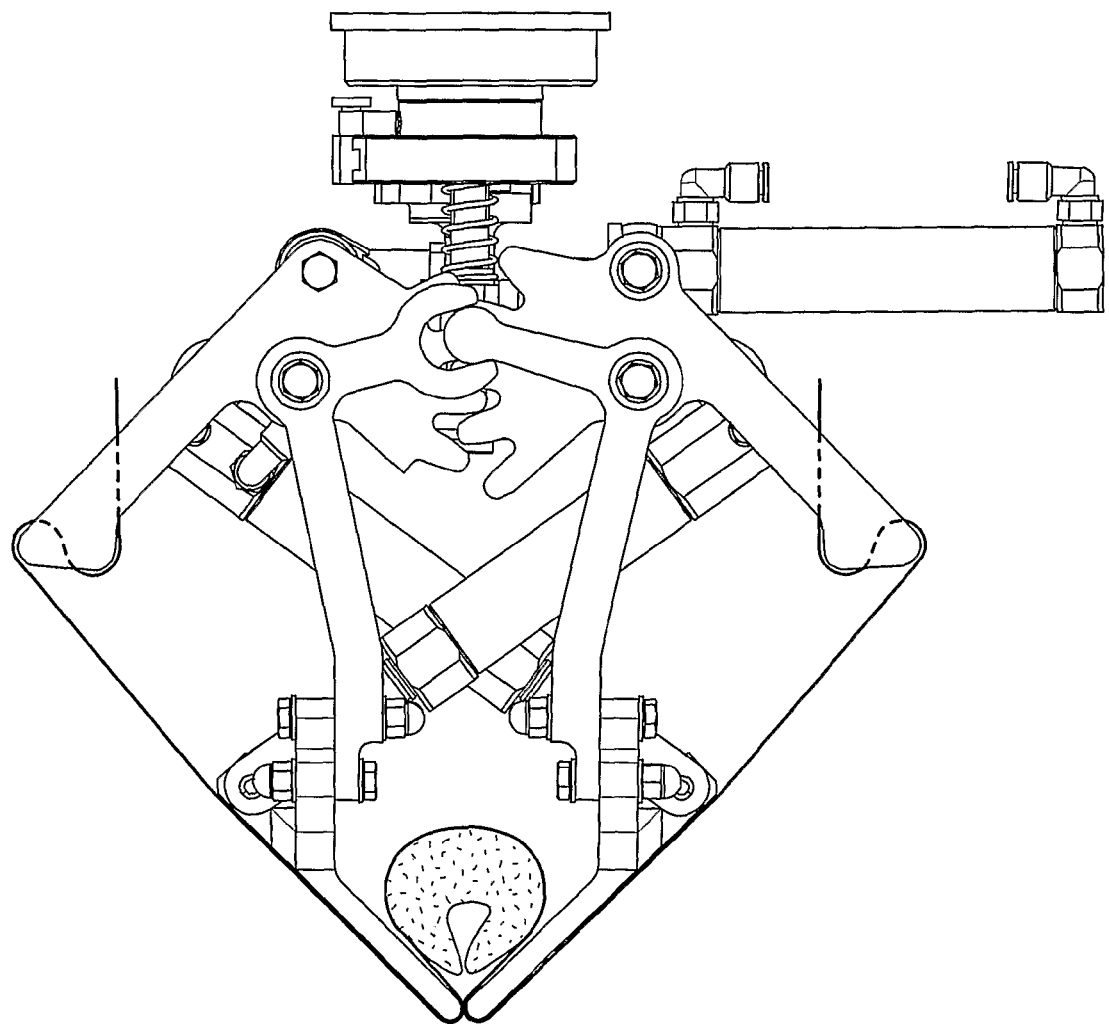
FIG. 7 shows the belt being tensioned around the product to hold it firmly and produce a roughly cylindrical shape if it is pliable.
Figure 8:
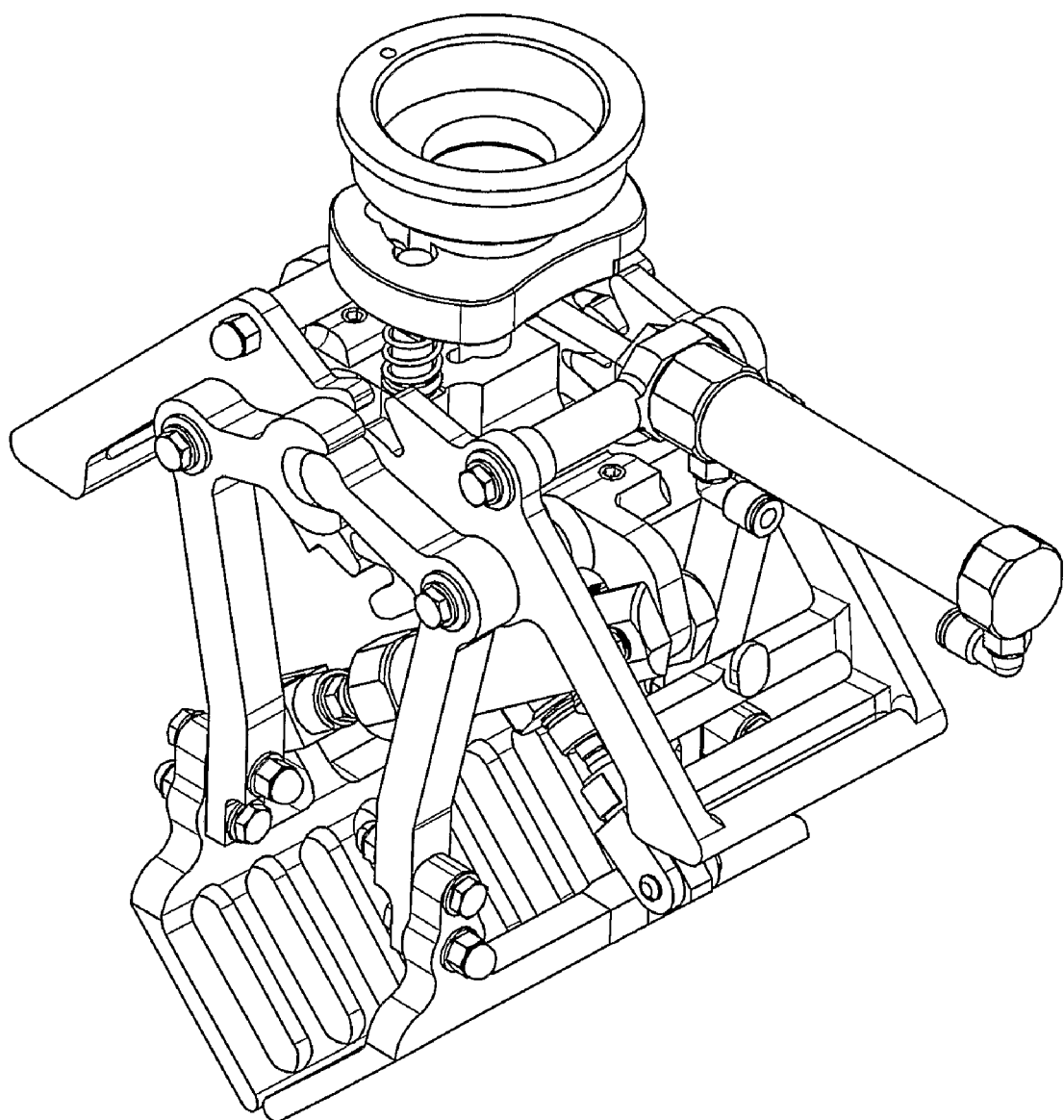
FIG. 8 is an isometric view of FIG. 7 but not showing the belt and product.

A short while after the jaws are closed pressure is applied to 14 trying to close the cylinder and tensioning the belt. The force applied is such that it draws the belt tight around the product, see FIG. 7. The belt tension is not sufficient to force the jaws apart at this stage.

Figure 9:
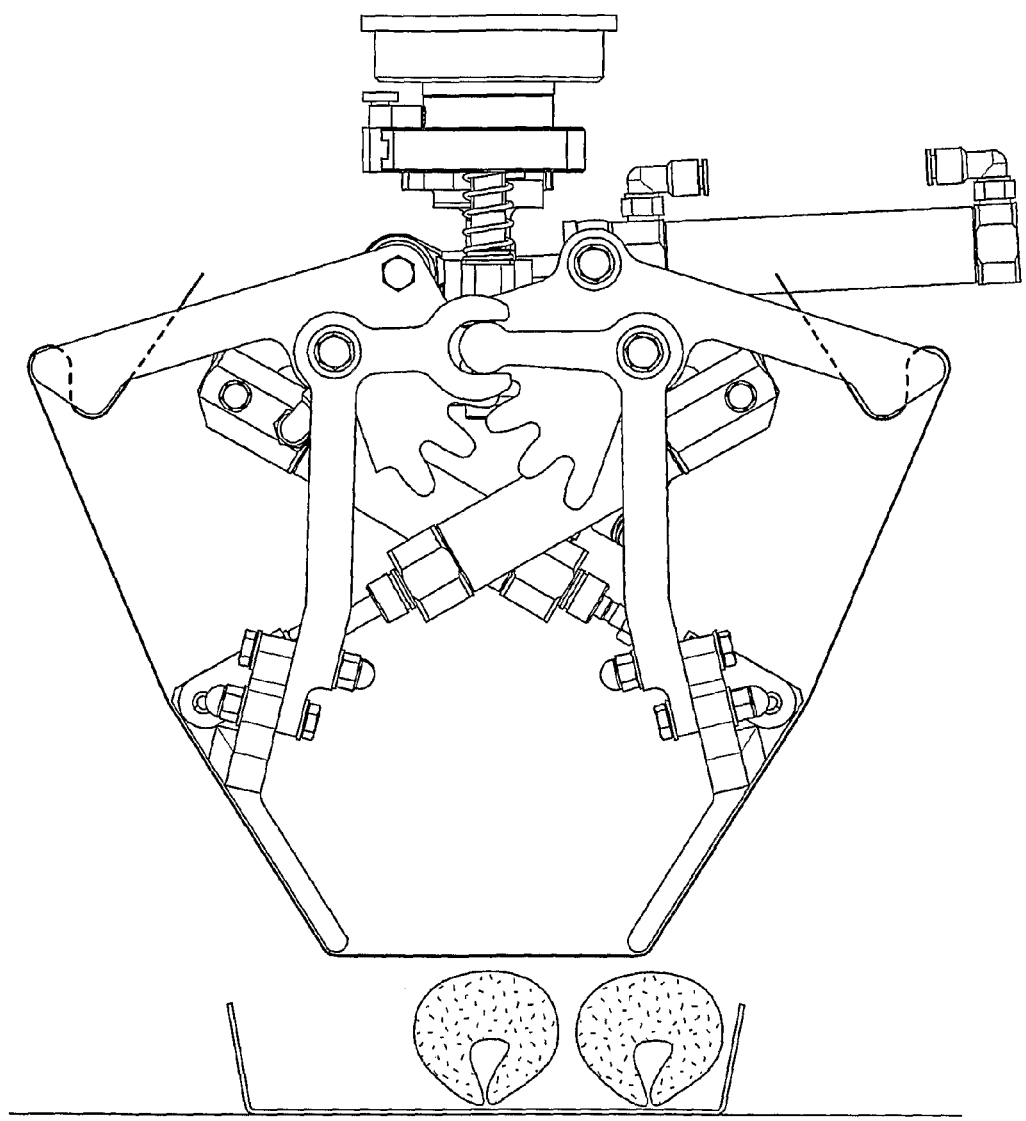
FIG. 9 shows the product being ejected from the gripper by releasing the force on the jaws (but still maintaining tension on the belt) into a receptacle (such as a tray), maintaining its roughly cylindrical shape.
Figure 10:
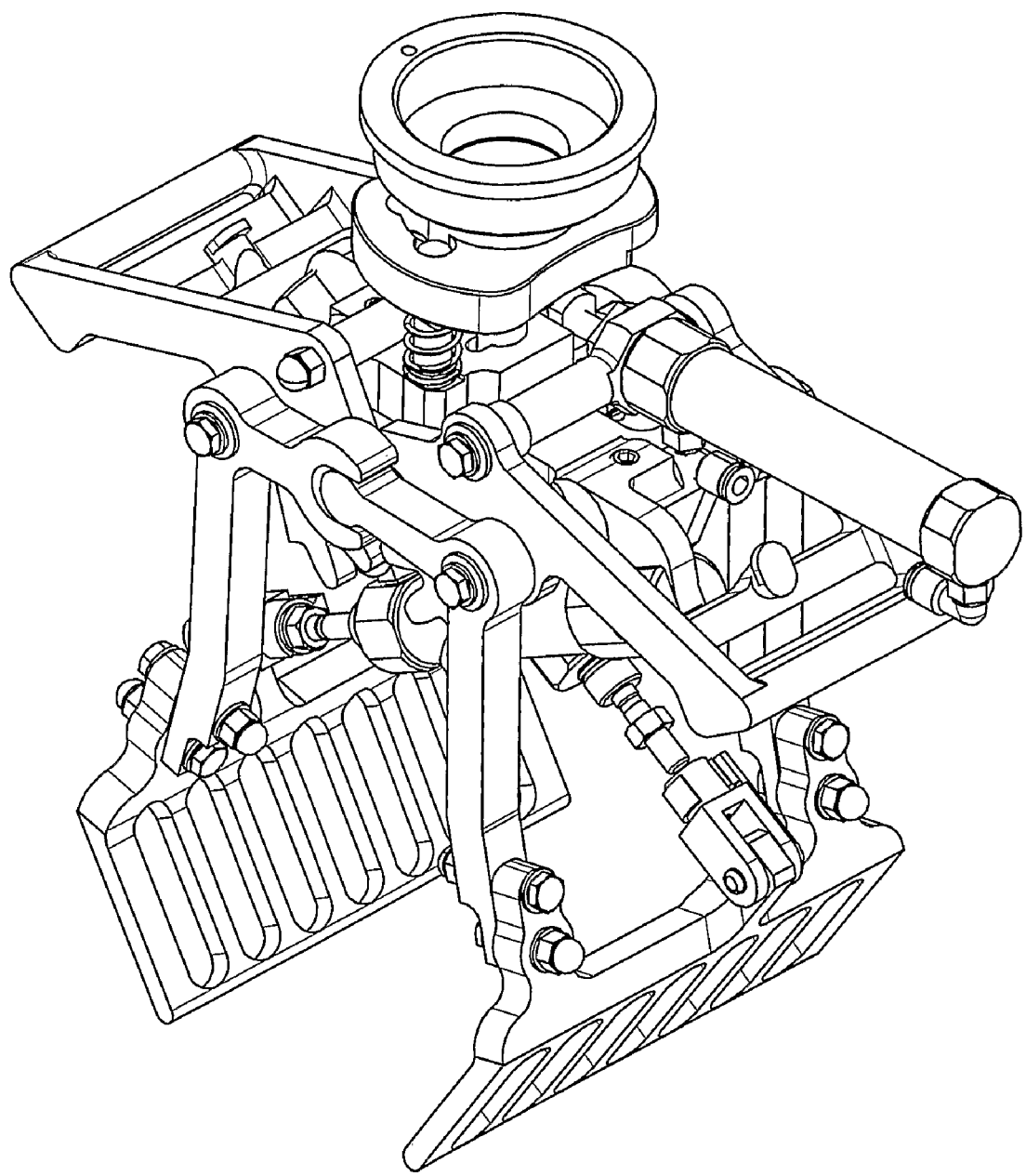
FIG. 10 is an isometric view of the gripper device in a different position than seen in FIG. 2.

In FIG. 9, for placing the product in a tray, the belt tension is maintained but the force on the jaws from 12 and 13 is released by switching the pressure off. The belt tension now is high enough to force the jaws apart and thus eject the product.

As the robot moves to pick up the next piece, pressure is applied to 12 and 13 to extend them and thus be in position to pick, see FIG. 1, and the pressure is simultaneously released on 14.

Reference numerals 15 and 16 identify part of the quick release device for mounting the gripper to the robot arm.

The invention claimed is:

1. A gripper device for picking up a pliable food product from a support surface and releasing the product, comprising:
   a support;
   a pair of grippers pivotally mounted on the support for movement of distal ends thereof towards and away from each other;
   a belt arranged to extend directly across the gap defined between the distal ends of the grippers when they are spaced apart so that the belt is able to extend over the food product to be picked up and to extend around the food product when the grippers have been moved towards each other to pick up the food product such that distal ends of the grippers penetrate between the food product and the support surface; and
   a belt tensioning arrangement that controls the tension of the belt.

2. A device of claim 1, wherein an end portion at the distal end of each gripper is angled inwardly towards the other gripper, with respect to the radial direction from the respective gripper pivot.

3. A device of claim 1, wherein an end portion at the distal end of each gripper defines an engagement surface which forms an obtuse angle with respect to the radial direction from the respective gripper pivot, when viewed parallel to the pivotal axis of the gripper.

4. A device of claim 3, wherein said obtuse angle is in the range of 120° to 160°.

5. A device of claim 1, wherein the grippers are linked together via a linkage arranged such that the grippers are rotatable in an opposite sense to each other and each rotates through substantially the same angle as the other.

6. A device of claim 1, wherein the belt tensioning arrangement comprises a pair of arms pivotally mounted on the support, with their distal ends coupled to respective ends of the belt.

7. A device of claim 6, wherein the arms are linked together via a linkage arranged such that the arms are rotatable in an opposite sense to each other and each rotates through substantially the same angle as the other.

8. A device of claim 6, wherein each arm includes a pair of bars having longitudinal axes substantially parallel with the pivotal axes of the arms, and each end of the belt passes between a respective pair of bars such that friction between the belt and the bars assists in coupling the belt to the arms.

9. A device of claim 1, wherein the belt is formed of an elastic material.

10. A device of claim 1, wherein each end of the belt is attached to a respective gripper.

11. A method for picking up a pliable food product from a support surface with a gripper device as claimed in claim 1, comprising:
   pivoting the pair of grippers towards each other such that their distal ends penetrate between the food product and the support surface, with the belt sandwiched between each gripper and the food product and extending between the grippers above the food product, until the gripper device is able to lift the food product from the support surface and
   controlling the tension of the belt with the belt tensioning arrangement.

12. A method of claim 11, including a step of increasing the tension in the belt with the belt tensioning arrangement, thereby drawing the belt out from between the grippers so that it wraps more tightly around the food product to retain it in position.

13. A method of claim 11 including a step of releasing the food product by driving the grippers apart.

14. A method of any of claim 11, including a step of increasing tension in the belt with the belt tensioning arrangement, thereby driving the grippers apart and releasing the food product.

15. A method of claim 11 including a step of releasing the food product by reducing or removing force applied to the grippers, allowing tension in the belt to force the grippers apart.

16. A method of claim 11 for picking up a pliable food product wherein the food product is reshaped into a more compact configuration by the grippers and belt as it is picked up.

* * * * *

UNITED STATES PATENT AND TRADEMARK OFFICE
CERTIFICATE OF CORRECTION

| | | |
|---|---|---|
| PATENT NO. | : 8,287,015 B2 | Page 1 of 1 |
| APPLICATION NO. | : 12/598231 | |
| DATED | : October 16, 2012 | |
| INVENTOR(S) | : Hawes | |

It is certified that error appears in the above-identified patent and that said Letters Patent is hereby corrected as shown below:

On the Title Page Item (74), under "Attorney, Agent, or Firm", in Column 2, Line 2, delete "LaBerge" and insert -- LaBarge --, therefor.

On the Title Page Item (57), under "ABSTRACT", in Column 2, Line 5, delete "is belt arranged" and insert -- is arranged --, therefor.

In the Claims

In Column 4, Line 52, in Claim 14, delete "A method of any of claim 11," and insert -- A method of claim 11, --, therefor.

Signed and Sealed this
Thirtieth Day of December, 2014

Michelle K. Lee
*Deputy Director of the United States Patent and Trademark Office*